United States Patent Office 3,059,015
Patented Oct. 16, 1962

3,059,015
PURIFICATION OF TRIARYL PHOSPHATES
Porter L. Pickard, Jr., Corpus Christi, and Earl G. Schmieding, Pampa, Tex., assignors to Celanese Corporation of America, New York, N.Y., a corporation of Delaware
No Drawing. Filed June 24, 1958, Ser. No. 744,060
11 Claims. (Cl. 260—461)

This invention relates to purification of crude triaryl phosphates. More particularly it relates to the oxidative removal of impurities from crude triaryl phosphates by a hypochlorite solution.

Purification of crude triaryl phosphates conventionally involves washing with caustic and then with potassium permanganate solution to remove oxidizable impurities. The excess potassium permanganate must then be destroyed, as by reduction with oxalic acid, and the bleached triaryl phosphate is then usually water washed, dried and clay treated in order to further purify it.

Unfortunately this procedure is also subject to several disadvantages. For one thing, potassium permanganate is comparatively expensive. Another serious disadvantage is that not all of the reaction products of the permanganate oxidation and the oxalic acid bleach are water soluble (notably manganous oxalate). As a result some scums are formed which must periodically be removed from the equipment. Worse, formation of the insoluble products makes carrying out the purification procedure in a continuous manner very difficult. To date, the art has largely operated on a batch basis.

The object of the instant invention is to provide an improved procedure for purifying triaryl phosphates.

A further object of the instant invention is to purify tricresyl phosphate by means of a sodium hypochlorite oxidation.

Still another object of the instant invention is to provide a continuous procedure for purifying triaryl phosphates.

Other objects will be apparent from the following detailed description and claims on which all proportions are by weight, unless otherwise indicated.

Essentially the instant process involves treating triaryl phosphate esters, notably tertiary phosphates of cresylic acid, with a dilute aqueous solution of a water soluble hypochlorite salt in order to remove oxidizable impurities.

On an overall basis, purification of triaryl phosphates according to the preferred practice of the instant invention is a multiple step process of the following steps:

(1) Washing with aqueous alkali, preferably sodium hydroxide,
(2) Washing with a dilute aqueous solution of the hypochlorite salt, preferably sodium hypochlorite which is the least expensive,
(3) Washing with pure water,
(4) Drying.

Thereafter there follows a conventional clay treatment which effects further purification. Advantageously at least steps 1, 2 and 3 are effected in a continuous manner.

Certain variations of the above procedure are also expressly contemplated. In particular the caustic and hypochlorite wash may be combined by employing an aqueous solution of both sodium hydroxide and sodium hypochlorite. Also, the waste water recovered from the washing step (3) can be employed to formulate the sodium hydroxide and, or alternatively, the hypochlorite solution.

The washing steps are preferably carried out at elevated temperature, e.g. in the range of about 50 to 99° C., preferably about 65 to 85° C.

Water is, of course, the principal ingredient of the caustic solution and the hypochlorite solution. Moreover, the purification employs a water washing step. By and large the water employed in each of the three wash steps may vary, for example, from about 50% to 500% (by volume) of the phosphate ester being treated. Should it be preferred to employ a combined caustic and hypochlorite solution, the total volume of the combined solution may range, for example, from 50% to 500% of the volume of triaryl phosphate being treated.

The quantity of caustic to be employed depends primarily upon the acidity exhibited by the phosphate ester. The caustic is intended to counteract and remove such acidity. Accordingly, the caustic is desirably employed in amount at least equivalent to the acidity in the phosphate ester, preferably in amount equivalent to about 10 to 100 times the acidity present in the phosphate ester. On a weight ratio the caustic would be customarily employed in quantities ranging from about 0.5 to 5 parts of NaOH per 100 parts of the triaryl phosphate, the caustic being supplied as a 0.1 to 5% aqueous solution.

Similarly, the quantity of hypochlorite to be employed depends upon the amount of oxidizable impurities present in the phosphate ester. The amount of oxidizable impurities is expressed as the permanganate demand of the phosphate ester; this is measured by titrating the phosphate ester with an aqueous solution of potassium permanganate until the color of the permanganate ceases to be discharged, the number of grams of potassium permanganate so added per 100 grams of phosphate ester being the permanganate demand. The amount of hypochlorite is desirably equivalent to about 100 to 500% of the permanganate demand. On a weight basis the hypochlorite (sodium) would be customarily employed in quantities ranging from 0.6 to 6.0 parts per 100 parts of tricresyl phosphate, the hypochlorite being supplied as a 0.1 to 5% aqueous solution.

The instant invention has its greatest utility in the purification of tri(methyl substituted phenyl)phosphates such as the tertiary phosphates of cresol or xylenol or the cresol or cresol-xylenol mixtures known as cresylic acid. However, it is also suitable for purification of tertiary phosphates of other hydroxyaryl compounds. Specific instances of hydroxyaryl compounds are phenol; ortho-, meta-, and para-cresol; any of the six xylenols; any of the six trimethyl phenols; any of the three tetra-methyl phenols; penta-methyl phenol; substituted phenols such as the ethyl, isopropyl, n-propyl, n-butyl, sec.-butyl, tert.-butyl, amyl, etc. which correspond to the series of methyl substituted phenols set forth above; phenols substituted with halogen, nitro- and similar groups; etc. Of course, the triaryl phosphate is preferably one free of groups which would interfere with the hypochlorite purification treatment. The triaryl phosphates may be produced in conventional manner, as by reaction of an excess of the hydroxyaryl compound with phosphorus oxychloride in the presence of a catalyst for the reaction, e.g. magnesium chloride, aluminum chloride or zinc chloride.

For a better understanding of the instant invention the following specific examples are presented.

*Example I*

The removal of oxidizable impurities was carried out by countercurrent extraction of one volume of crude tertiary phosphate of cresylic acid in a York-Scheibel column with two volumes of an aqueous solution containing 1.9% NaOH and 0.5% NaOCl, and thereafter washing the phosphate with three volumes of tap water in a second column, both columns being at 80° C. Before this treatment the phosphate ester had an APHA color of 150, a permanganate demand of 1.3 grams per hundred grams, an acidity of 0.12 mg. KOH per gram. After the washing procedures and subsequently drying and treating with fuller's earth the finished ester had an APHA color of 90, an acidity of 0.02 mg. KOH per gram and a permanganate time greater than 24 hours.

The aqueous overhead from the first column contained 1.87% NaOH and 0.17% NaOCl. The aqueous overhead from the second column contained 0.0 NaOH and 0.01% NaOCl.

The cresylic acid used to make the ester of this example is a mixture of alkyl phenols containing some phenol, per se. By mass spectrometric analysis it contains: $C_{10}$ phenols 0.5%; $C_9$ phenols 10.0%; $C_8$ phenols 72.0%; cresols, 14.5%; phenol 3.0%.

Example II

A sample of tertiary phosphate ester of the cresylic acid described in Example I was distilled to remove excess cresylic acid. The heart cut having a permanganate demand of 1.03 grams potassium permanganate per 100 grams of ester and an acid number of 0.11 was treated in three different ways to produce a finished ester. The following table gives the treatments and the results obtained. All washes were carried out at 80–85° C. with with the volume of aqueous wash liquid equal to the volume of the phosphate ester. All caustic washes used an aqueous solution of 1.5% NaOH. Each washing was conducted by stirring the liquids together for 20 minutes then allowing the phases to separate.

Example III

Another series of comparison tests were run on a crude heart cut tertiary phosphate ester of the cresylic acid described in Example I. It was washed at 80° C. for ten to thirty minutes with an equal volume of different wash solutions, the permanganate demand of the product being determined at several points during the wash cycle. The following Table II demonstrates that a combined sodium hypochlorite and caustic treatment (C&D) is far more effective than caustic and another oxidizing agent, namely hydrogen peroxide (B) which might be expected to oxidize impurities in the phosphate ester.

| A | | B | | C | |
|---|---|---|---|---|---|
| Treatment | KMnO4 Demand | Treatment | KMnO4 Demand | Treatment | KMnO4 Demand |
| Caustic wash | 0.40 | 2 Caustic washes | | 2 Caustic washes | |
| Do | 0.35 | 0.52% NaOCl wash | | 0.71% NaOCl wash [1] | 0.06 |
| Do | 0.26 | Water wash | 0.07 | 0.71% NaOCl wash | |
| 5.25% NaOCl wash | | 0.52% NaOCl wash | | Water wash | |
| Water wash | 0.05 | Water wash | | Acified water wash [2] | |
| 1.75% NaOCl wash | 0.04 | Dried | 0.04 | Dried | 0.02 |
| Water wash | | Filtered with 1% fuller's earth. | 0.01 | Filtered with 1% fuller's earth. | 0.01 |
| Dried | | | | | |
| Filtered with 1% fuller's earth. | 0.02 | | | | |

[1] This amount of NaOCl was equivalent to the permanganate demand of the sample.
[2] Sufficient HCl was added to lower the pH to about 4.

| Run | Wash Solution Sequence | Number of Washes | KMnO4 Demand, g. KMnO4/ 100 g. ester |
|---|---|---|---|
| A | Water and HCl (acid to litmus) | 2 | 0.18 |
| B | 1.5 Wt. percent NaOH plus 0.5 wt. percent Hydrogen Peroxide, then. | 2 | 0.14 |
| | Water | 1 | 0.13 |
| C | 1.5 Wt. percent NOH plus 0.06 percent NaOCl, then. | 1 | 0.08 |
| | Water | 1 | 0.07 |
| D | 1.5 Wt percent NaOH plus 0.06 percent NaOCl, then. | 1 | |
| | Water | 1 | 0.015 |

Example IV

Using a York-Scheibel countercurrent extraction column operated at a thousand r.p.m. and 85° C. and feeding an aqueous wash solution of 1.5% sodium hydroxide and 0.5% sodium hypochlorite, heart cut triaryl phosphates (produced from a distilled xylenol feed stock which analyzed 79.5% xylenols, 18% cresols and 2.5% phenol; from the crude xylenol from which the aforesaid distilled feed stock was obtained; and from a meta-para cresol containing, by vapor phase chromatographic analysis, 2.5% phenol, 65% m- and p-cresol, no o-cresol, 27.0% xylenols, and 5% unknown material) were studied at different ratios of wash solutions of triaryl phosphate. In each case the extracted product was then water washed in the same column at the same ratio of wash solution to triaryl phosphate, then dried and treated with fuller's earth. The following table gives the detailed results.

| Heart Cut From | Volume Ratio Wash Solution to Triaryl Phosphate | Concentrations of Wash Solution | | | |
|---|---|---|---|---|---|
| | | NaOH | | NaOCl | |
| | | In | Out | In | Out |
| A. Distilled Xylenol | 4 | | | | |
| B. Distilled Xylenol | 4 | 1.90 | 1.75 | 0.53 | 0.28 |
| C. Crude Xylenol | 2 | 1.96 | 1.76 | 0.54 | 0.12 |
| D. Meta-para Cresol | 2 | 1.61 | 1.57 | 0.48 | 0.18 |

| | Residence[1] Time, min. | | Feed Rates, ml./min. | |
|---|---|---|---|---|
| | Triaryl Phosphate | Wash | Triaryl Phosphate | Wash |
| A | 50 | 48 | 2.4 | 10.0 |
| B | 48 | 43 | 2.5 | 10.0 |
| C | 26 | 40 | 4.6 | 10.8 |
| D | 25 | 39 | 4.8 | 10.9 |

[1] Based on volumes of triaryl phosphate and water held in the column.

The properties of the products are tabulated below:

| | Acidity, mg. KOH/g. | KMnO4 Demand | KMnO4[1] Time, hours |
|---|---|---|---|
| A | 0.13 | 0.06 | 24 |
| B | | | 24 |
| C | 0.05 | 0.00 | 24 |
| D | 0.03 | 0.00 | 24 |

[1] KMnO4 time is determined by mixing 10 grams of sample with 50 ml. of 0.032 wt. percent KMnO4 solution, shaking vigorously for 2 minutes, and then allowing to stand. The time in minutes, or hours, elapsing between the permanganate addition and the time the permanganate color is reduced is the permanganate time.

Example V

In order to determine the results with a continuous system a tertiary phosphate ester of cresylic acid was passed successively through a series of three washing vessels, each equipped with a stirrer for thoroughly agitating its contents. To the second vessel there was fed an aqueous solution containing 3% sodium hydroxide and 3% sodium hypochlorite. The aqueous phase obtained from the second vessel was fed to the first vessel, so that the phosphate ester was washed countercurrent with the alkaline hypochlorite in the first two vessels. In the third vessel the phosphate ester was washed with water, and the waste water phase from the third vessel was used to dilute concentrated caustic-hypochlorite solution fed to the second of the two washing vessels. The feed rates were such that each vessel contained equal volumes of aqueous phase and water-insoluble phase. Residence time was about 2 hours in each vessel. The product was then dehydrated (by heating to about 85° C. under vacuum to distill off its small water content, e.g., 2%) and thereafter treated for 30 minutes with 1% of its weight of fuller's earth. A product of very low permanganate demand was obtained.

In all the above examples the phosphate ester was produced in conventional manner by the reaction of the hydroxyaryl compound with phosphorus oxychloride in the presence of a small amount of magnesium chloride catalyst.

It is to be understood that the foregoing detailed description is given merely by way of illustration and that many variations may be made therein without departing from the spirit of our invention.

Having described our invention what we desire to secure by Letters Patent is:

1. A procedure for purifying crude triaryl phosphate which comprises contacting the triaryl phosphate with caustic and with a hypochlorite salt, both in dilute aqueous solution and thereafter water washing the triaryl phosphate to remove therefrom the water soluble reaction products and inorganic salts.

2. The process of claim 1 wherein a combined caustic-hypochlorite solution is employed.

3. Process of claim 1 wherein the triaryl phosphate is contacted first with a caustic solution and then with a hypochlorite salt solution.

4. In a process for purifying triaryl phosphates, the improvement which comprises removing acidity and oxidizable impurities therefrom by washing with aqueous alkali and aqueous hypochlorite salt, then removing water soluble oxidation products and inorganic salts by a water wash.

5. Process as set forth in claim 4 in which the triaryl phosphate is an ester of cresylic acid.

6. Process as set forth in claim 5 in which the triaryl phosphate is one obtained by reaction of phosphorus oxychloride and cresylic acid.

7. Process as set forth in claim 6 in which the aqueous alkali is sodium hydroxide of concentration about 0.1 to 5% and the aqueous hypochlorite is sodium hypochlorite of concentration about 0.1 to 5%.

8. The process of claim 6 wherein the amount of caustic used is equivalent to about 10 and 100 times the acidity present in the triaryl phosphate and the amount of hypochlorite is equivalent to about 100 to 500% of the permanganate demand of the tricresyl phosphate.

9. Process as set forth in claim 7 in which the washed triaryl phosphate is thereafter dried and treated with fuller's earth.

10. Process as set forth in claim 4 in which the triaryl phosphate is an ester of xylenol.

11. In the process for the production of triaryl phosphates by the reaction of phosphorus oxychloride with a hydroxyaryl compound, the improvement which comprises contacting the triaryl phosphate produced with caustic and with a hypochlorite salt, both in dilute aqueous solution and thereafter water washing the triaryl phosphate to remove therefrom the water soluble reaction products and inorganic salts.

References Cited in the file of this patent
UNITED STATES PATENTS

| | | |
|---|---|---|
| 1,931,059 | Clemmensen | Oct. 17, 1933 |
| 2,070,027 | Reid | Feb. 9, 1937 |

FOREIGN PATENTS

| | | |
|---|---|---|
| 737,431 | Great Britain | Sept. 28, 1955 |

OTHER REFERENCES

The Condensed Chemical Dictionary, 5th edition, 1956, pages 581 and 1003.